United States Patent
Marsden et al.

(10) Patent No.: US 7,850,234 B2
(45) Date of Patent: *Dec. 14, 2010

(54) ENERGY-DISSIPATION SYSTEM

(75) Inventors: Andrew W. Marsden, Hingham, MA (US); Ward Fritz, Chelsea, MA (US); Walter S. Bezaniuk, Berkley, MA (US); Joe Langley, Riverside, RI (US); David Amirault, Easton, MA (US); Steve Lepke, Wakefield, MA (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/788,402

(22) Filed: May 27, 2010

(65) Prior Publication Data

US 2010/0231012 A1    Sep. 16, 2010

Related U.S. Application Data

(63) Continuation of application No. 12/328,376, filed on Dec. 4, 2008, now Pat. No. 7,744,154.

(60) Provisional application No. 61/084,889, filed on Jul. 30, 2008.

(51) Int. Cl.
| | |
|---|---|
| A47D 1/10 | (2006.01) |
| B60N 2/42 | (2006.01) |
| B60N 2/427 | (2006.01) |
| B60R 21/00 | (2006.01) |
| B60R 21/02 | (2006.01) |
| B60R 21/055 | (2006.01) |
| B60R 21/268 | (2006.01) |

(52) U.S. Cl. ............................. 297/216.11; 297/250.1
(58) Field of Classification Search .............. 297/250.1, 297/216.11, 219.12
See application file for complete search history.

(56) References Cited

U.S. PATENT DOCUMENTS

| | | | |
|---|---|---|---|
| 4,642,814 | A | 2/1987 | Godfrey |
| 4,899,961 | A | 2/1990 | Herndon |
| 4,919,483 | A | 4/1990 | Horkey |
| 5,235,715 | A | 8/1993 | Donzis |
| 5,292,175 | A | 3/1994 | Artz |
| 5,292,176 | A | 3/1994 | Artz |
| 5,335,968 | A | 8/1994 | Sheridan et al. |
| 5,567,015 | A | 10/1996 | Arias |
| 5,881,395 | A | 3/1999 | Donzis |

(Continued)

FOREIGN PATENT DOCUMENTS

WO    2009/076514    6/2009

OTHER PUBLICATIONS

International Search Report dated Feb. 13, 2009, for International Application No. PCT/US2008/087382.

(Continued)

*Primary Examiner*—Rodney B White
(74) *Attorney, Agent, or Firm*—Barnes & Thornburg LLP

(57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

27 Claims, 11 Drawing Sheets

U.S. PATENT DOCUMENTS

| | | | |
|---|---|---|---|
| 6,485,101 B2 | 11/2002 | Kassai et al. | |
| 6,519,780 B2 | 2/2003 | Goodwin | |
| 7,125,073 B2 | 10/2006 | Yoshida | |
| 7,232,182 B2 | 6/2007 | Yoshida | |
| 7,234,771 B2 | 6/2007 | Nakhla | |
| 7,246,853 B2 | 7/2007 | Harcourt et al. | |
| 7,293,828 B2 | 11/2007 | Yoshida | |
| 7,654,613 B2 | 2/2010 | Bass | |
| 7,717,506 B2 * | 5/2010 | Amesar et al. | 297/216.11 |
| 7,726,734 B2 * | 6/2010 | Mahal et al. | 297/250.1 |
| 7,744,154 B2 * | 6/2010 | Marsden et al. | 297/250.1 |
| 7,748,781 B2 * | 7/2010 | Bass | 297/250.1 |
| 7,774,866 B2 | 8/2010 | Ferrara | |
| 2002/0153753 A1 | 10/2002 | Kassai | |
| 2007/0085394 A1 | 4/2007 | Yang | |
| 2007/0252418 A1 | 11/2007 | Harcourt et al. | |
| 2008/0258518 A1 | 10/2008 | Santamaria | |
| 2009/0152913 A1 | 6/2009 | Amesar et al. | |
| 2009/0179469 A1 | 7/2009 | Bass | |
| 2009/0179470 A1 | 7/2009 | Bass | |
| 2009/0256404 A1 | 10/2009 | Strong et al. | |
| 2010/0019554 A1 | 1/2010 | Mahal et al. | |
| 2010/0194158 A1 * | 8/2010 | Mahal et al. | 297/216.11 |

OTHER PUBLICATIONS

International Preliminary Report on Patentability (Ch. II) issued in connection with PCT/US2008/087382 and completed by the U.S. Examining Authority on Oct. 9, 2010.

* cited by examiner

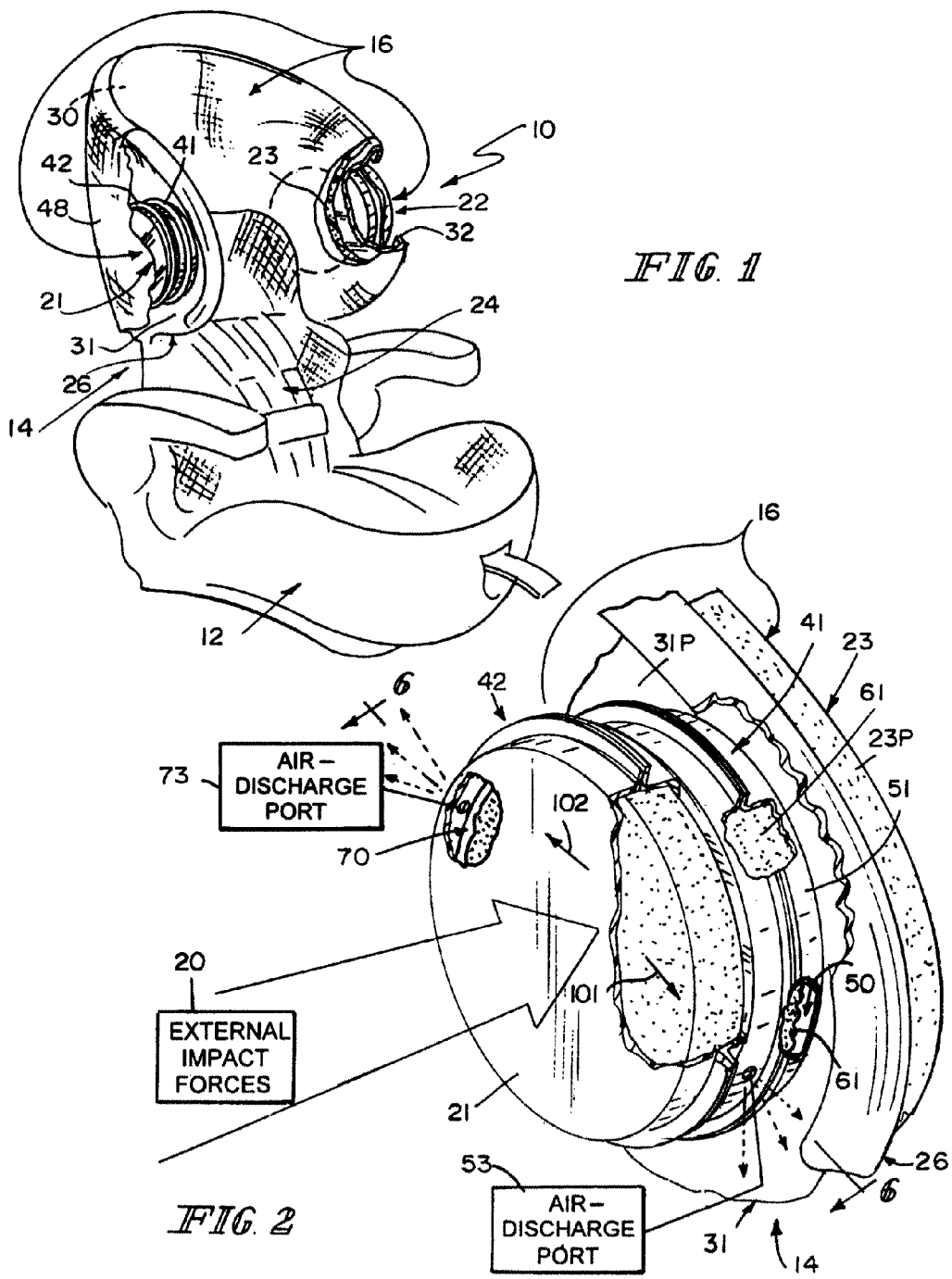

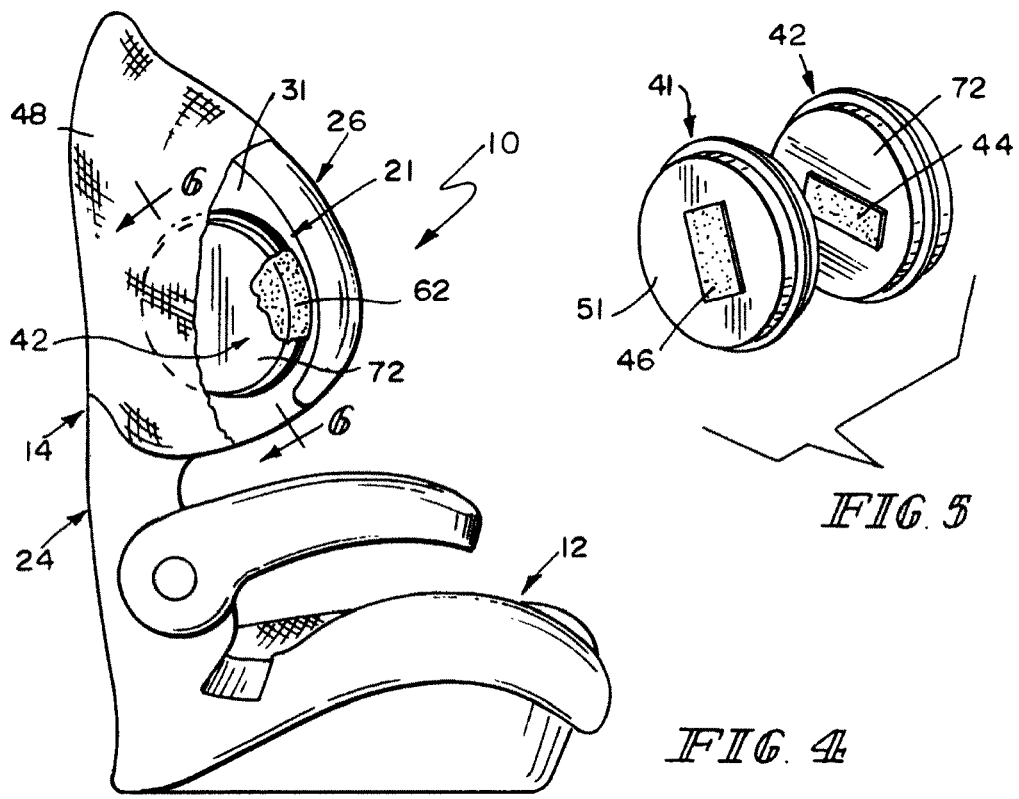
FIG. 4
FIG. 5
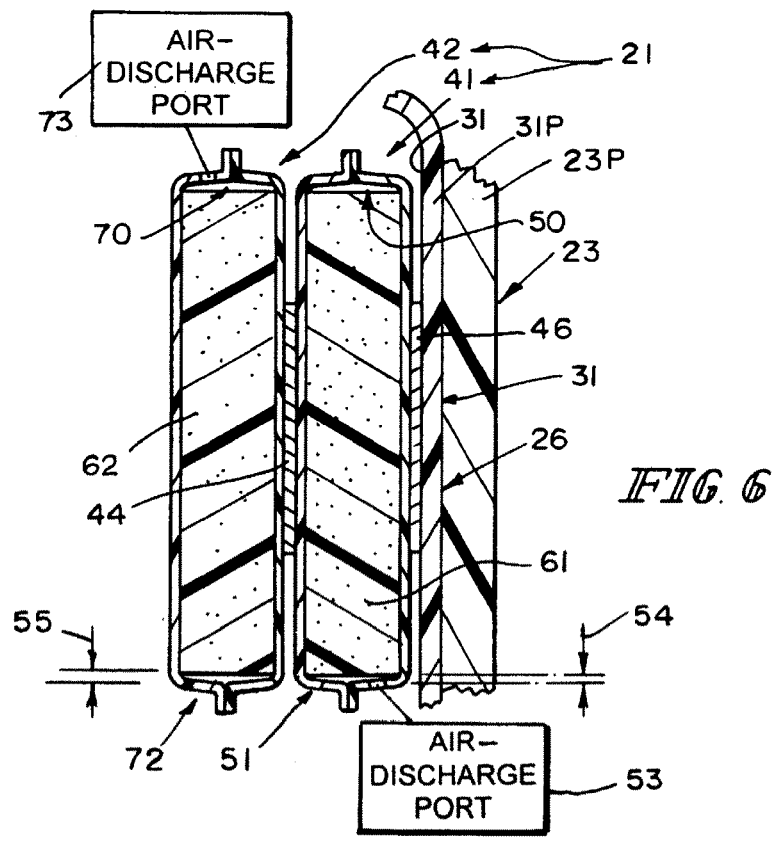
FIG. 6

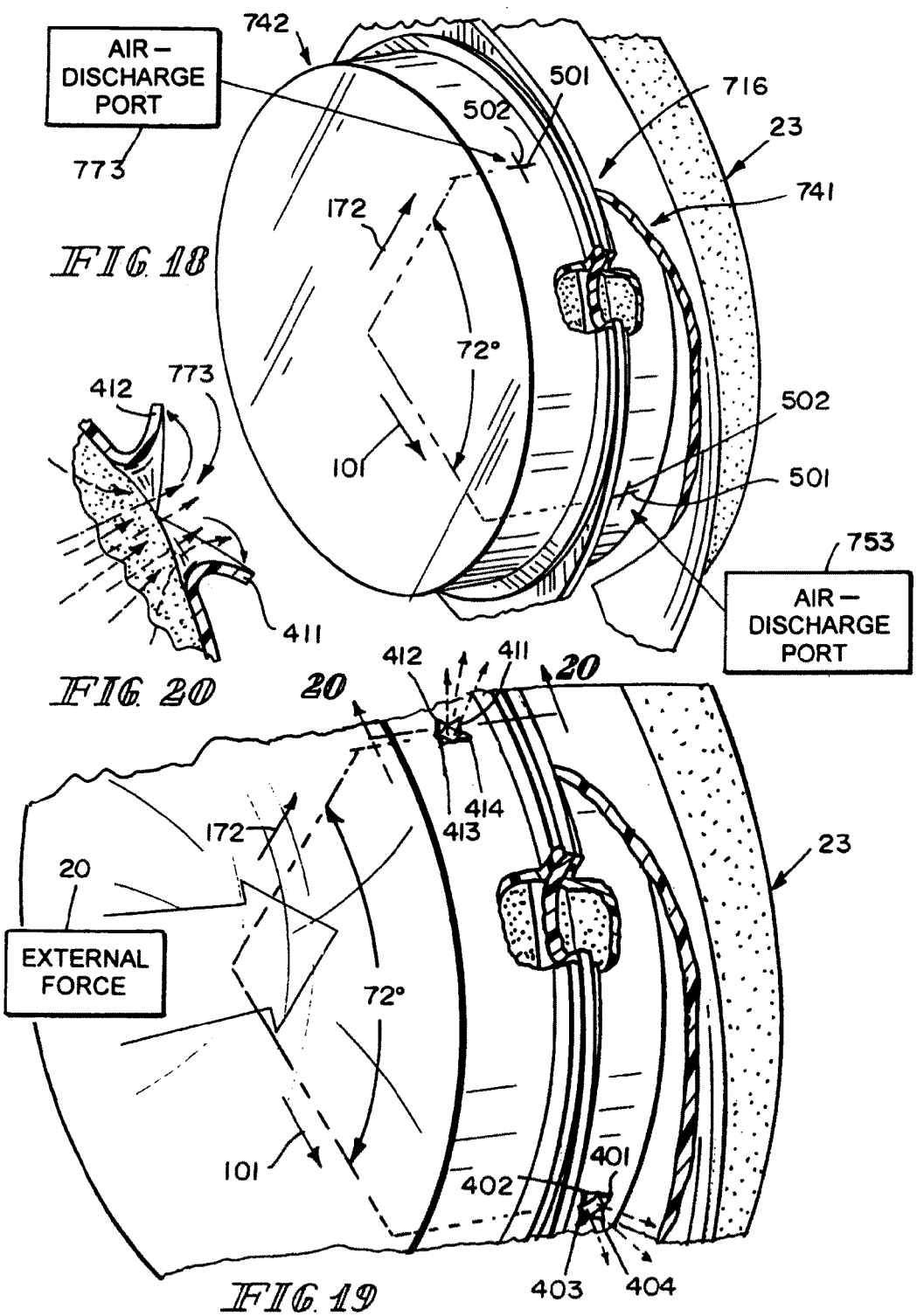

ENERGY-DISSIPATION SYSTEM

This is a continuation application of U.S. application Ser. No. 12/328,376, filed Dec. 4, 2008, now U.S. Pat. No. 7,744,154 B2, which claims priority under 35 U.S.C. §119(e) to U.S. Provisional Application Ser. No. 61/084,889, filed Jul. 30, 2008, which is expressly incorporated by reference herein.

BACKGROUND

The present disclosure relates to energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in gs.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In illustrative embodiments, the energy-dissipation system includes a ride-down pad comprising a first force dissipater containing a volume of air that is discharged at a metered rate when the first force dissipater is exposed to an external impact force. The first force dissipater is thus configured to provide means for absorbing external energy applied to the first force dissipater.

In illustrative embodiments, the first force dissipater includes a vessel for holding air or other fluid in an air chamber until the vessel is deformed when exposed to an external impact force. External energy is absorbed as air is discharged from the air chamber of the vessel after the vessel has been exposed to an external impact force.

In illustrative embodiments, the vessel is formed to include an air-discharge port opening into the air chamber. Air extant in the air chamber is discharged through the air-discharge port when the vessel is exposed to an external impact force. In illustrative embodiments, the air-discharge port is defined by an aperture formed in the vessel or a cross-shaped pair of intersecting slits formed in the vessel.

In illustrative embodiments, the vessel is a bag made of a deformable material formed to include the air-discharge port. For example, the bag can be made of a plastics material such as polyvinyl chloride or nylon.

In illustrative embodiments, the first force dissipater in the ride-down pad also includes a deformable support frame located in the air chamber of the vessel. The deformable support frame provides means for supporting the vessel to maintain at least a predetermined volume of air in the air chamber until the vessel is deformed when exposed to an external impact force so that the vessel does not deform too quickly and deforms at a rate that allows the vessel to absorb external energy associated with the external impact force. In illustrative embodiments, the deformable support frame is a cushion that is sized to fill most of the air chamber in a companion vessel.

In illustrative embodiments, the ride-down pad of the energy-dissipation further comprises a second force dissipater arranged to lie alongside the first force dissipater to form a stack of force dissipaters. The first force dissipater is coupled to the juvenile vehicle seat and the second force dissipater is arranged to lie in spaced-apart relation to the juvenile vehicle seat to locate the first force dissipater therebetween. The first and second force dissipaters cooperate to define a multi-stage ride-down pad. An external impact force will strike and deform the second force dissipater in a first stage and this will lead to deformation of the first force dissipater in a second stage so as to absorb external energy associated with the external impact force and minimize g-loads experienced by a child seated in the juvenile vehicle seat.

In illustrative embodiments, a ride-down pad kit in accordance with the present disclosure comprises a first vessel formed to include a first air chamber and an assortment of different deformable support frames sized to fit into the first air chamber. Each of the deformable support frames is characterized by a different deformation characteristic. Using the kit, it is possible for a ride-down pad designer to select a desired deformable support frame from among the available frames and place it in the first air chamber of the first vessel to produce a first force dissipater having a desired energy absorption characteristic and ride-down time. The ride-down pad kit can further comprise a second vessel formed to include a second air chamber and assortment of different deformable support frames sized to fit into the second air chamber.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child-restraint system including a juvenile vehicle seat having a seat bottom and a seat back extending upwardly from the seat bottom and an energy-dissipation system coupled to the seat back and made in accordance with a first embodiment of the present disclosure, with portions broken away, and showing that the seat back comprises a backrest coupled to the seat bottom and a headrest coupled to the backrest and that the energy-dissipation system comprises a left-side ride-down pad mounted on an outer wall of a first side-wing panel included in the headrest and a right-side ride-down pad mounted on an outer wall of an opposite second side-wing panel included in the headrest;

FIG. 2 is an enlarged perspective view of the left-side ride-down pad and the first side-wing panel of the headrest shown in FIG. 1, with portions broken away, and showing an external impact force about to strike an outer portion of the left-side ride-down pad;

FIG. 4 is a side elevation view of the juvenile vehicle seat of FIG. 1, with portions broken away, to reveal the left-side ride-down pad;

FIG. 5 is a perspective view of the first (inner) and second (outer) force dissipaters included in the left-side ride-down pad while they are separated from one another and before they are mounted on the juvenile vehicle seat shown in FIG. 1;

FIG. 6 is an enlarged sectional view taken along line 6-6 of FIG. 2 and of FIG. 4 showing placement of the left-side ride-down pad on an outer wall of a first side-wing panel of the headrest and placement of an interior pad on an inner wall of the first side-wing panel of the headrest;

FIG. 7 shows a diagrammatic representation of a child at time $t_0$ before an external impact force is applied to the left-side ride-down pad mounted on the juvenile vehicle seat;

FIG. 8 is a diagrammatic view similar to FIG. 7 at a later time $t_1$ after the external impact force has deformed the second bag and second cushion included in the second (outer) force dissipater;

FIG. 9 is a diagrammatic view similar to FIGS. 7 and 8 at a still later time $t_2$ after the external impact force has also deformed the first bag and first cushion included in the first (inner) force dissipater;

FIG. 14 shows a diagrammatic representation of a child at a time $t_0$ before an external impact force is applied to the left-side ride-down pad;

FIG. 15 is a diagrammatic view similar to FIG. 14 at a later time $t_1$ after the external impact force has deformed the outer shell and the second cushion included in a second (outer) force dissipater included in the energy-dissipation system of FIGS. 11-13;

FIG. 16 is a diagrammatic view similar to FIGS. 14 and 15 at a still later time $t_2$ after the external impact force has also deformed the partition and first cushion included in a first (inner) force dissipater included in the energy-dissipation system of FIGS. 11-13;

FIG. 18 is a perspective view similar to FIG. 17 showing that each of the first and second air-discharge ports is a cruciform opening defined by a cross-shaped pair of intersecting slits;

FIG. 19 shows the four adjacent corner-shaped flaps separated from one another by the cross-shaped pair of intersecting slits spread apart to discharge air extant in a companion air chamber in response to application of an external force to the bag of the second (outer) force dissipater;

FIG. 20 is an enlarged view taken along line 20-20 of FIG. 19;

DETAILED DESCRIPTION

Figure 3:
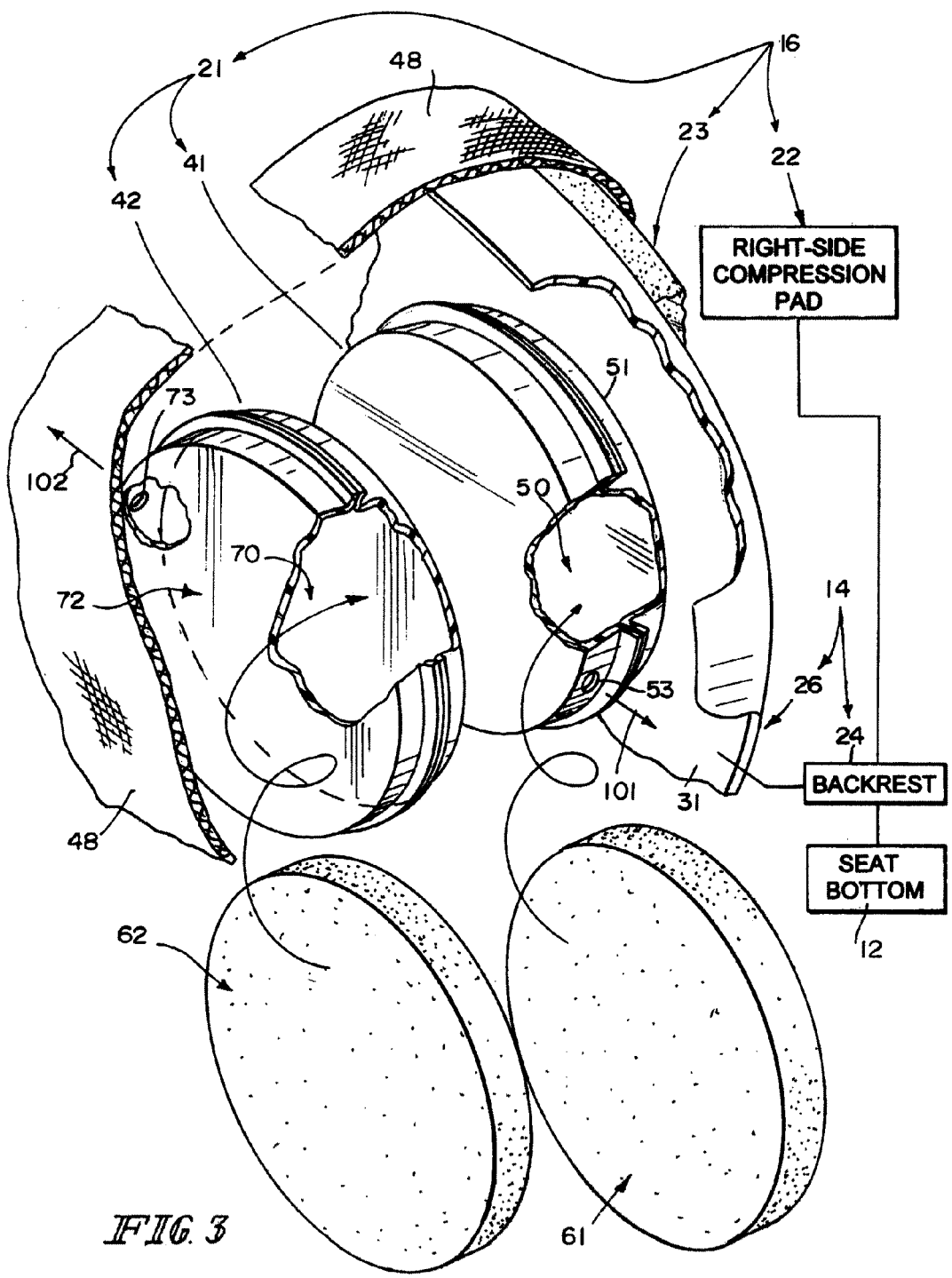
FIG. 3 is an exploded perspective assembly view of the left-side ride-down pad of FIG. 2 showing that the ride-down pad is a multi-stage unit comprising (1) a first (inner) force dissipater including a first vessel (e.g., bag) formed to include a first air chamber and a forwardly facing first air-discharge port opening into the first air chamber and a first deformable support frame (e.g., cushion) sized to be located in the first air chamber and (2) a second (outer) force dissipater including a second vessel (e.g., bag) formed to include a second air chamber and a rearwardly facing second air-discharge port opening into the second air chamber and a second deformable support frame (e.g., cushion) sized to be located in the second air chamber.

One illustrative child-restraint system 11 comprises a juvenile vehicle seat 10 and an energy-dissipation system 16 coupled to juvenile vehicle seat 10 as suggested in FIG. 1. In illustrative embodiments, juvenile vehicle seat 10 includes a seat bottom 12 and a seat back 14 extending upwardly from seat bottom 12. A first illustrative energy-dissipation system 16 is coupled to seat back 14 of juvenile vehicle seat 10 as suggested in FIG. 1. A second illustrative energy-dissipation system 116 is coupled to a seat back 14 of a juvenile vehicle seat 110 to form an illustrative child-restraint system 111 as suggested in FIG. 11. Other illustrative energy-dissipation systems 616, 716, 816, and 916 and components thereof are shown in FIGS. 17-22. It is within the scope of this disclosure to mount energy-dissipation systems 16 or 116 of a child-restraint system on a juvenile seat or other device to dissipate energy transferred to such a seat or apparatus by means of an external impact force applied to the seat or apparatus.

Figure 21:
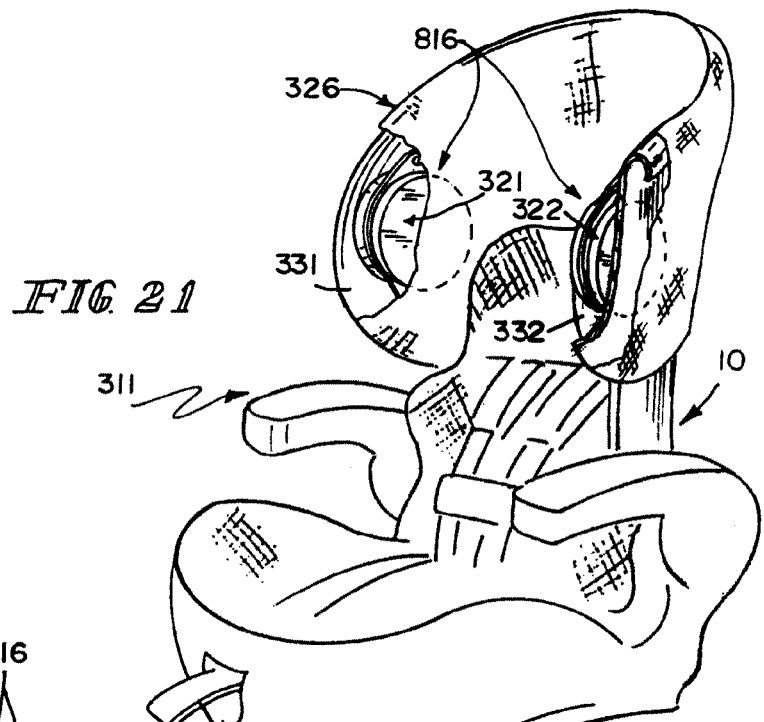
FIG. 21 is a perspective view of a child-restraint system in accordance with another embodiment of the disclosure showing multi-stage left-side and right-side ride-down pads wherein the left-side ride-down pad is coupled to an inner wall of a first side-wing panel of the headrest and the right-side ride-down pad is coupled to an inner wall of a second side-wing panel of the headrest.
Figure 22:
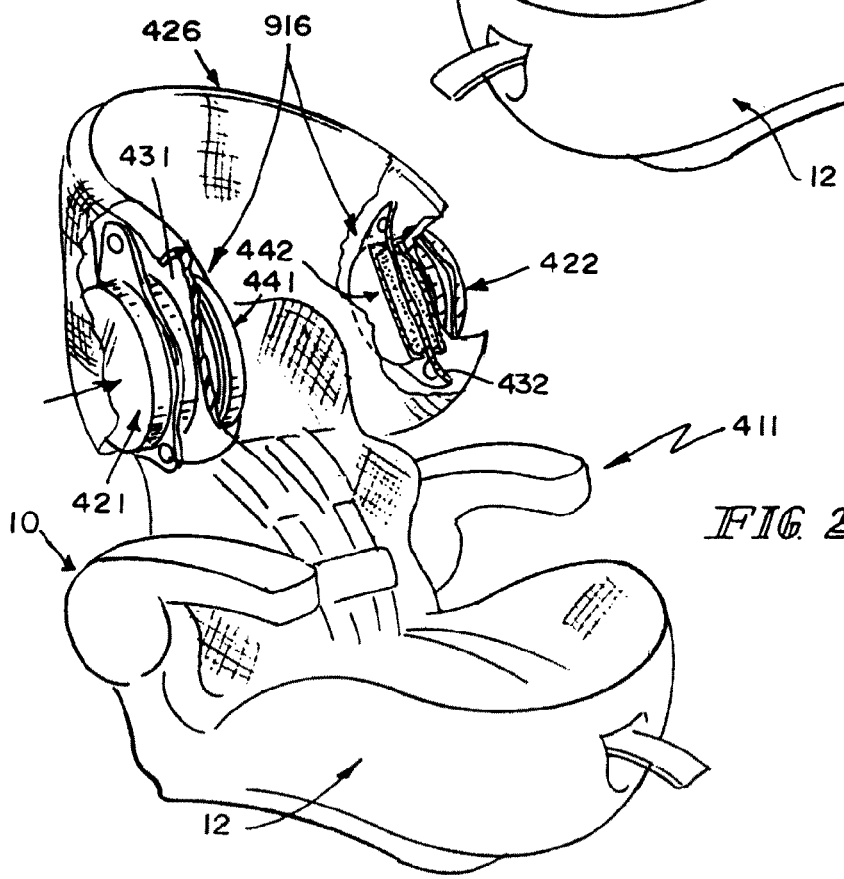
FIG. 22 is a perspective view of a child-restraint system in accordance with yet another embodiment of the disclosure showing four multi-stage ride-down pads wherein a pad is carried on each of the outer and inner walls of the first side-wing panel of the headrest and a pad is also carried on each of the inner and outer walls of the opposite second side-wing panel of the headrest.

Each energy-dissipation system 16, 116, 616, 716, 816, 916 comprises a ride-down pad that is designed to minimize the g-loads experienced by a child seated on seat bottom 12 of juvenile vehicle seat 10 during exposure of seat 10 to an external impact force. Multi-stage ride-down pads 21, 22 in accordance with a first embodiment of the present disclosure are shown in FIGS. 1-9. An illustrative kit 11 for making an illustrative ride-down pad is shown in FIG. 10. Multi-stage ride-down pads 121, 122 in accordance with a second embodiment of the present disclosure are shown in FIGS. 11-16. Other embodiments are shown in FIGS. 21 and 22. It is within the scope of this disclosure to provide a single-stage ride-down pad as suggested herein and for use in any of the designs shown, for example, in FIGS. 1, 11, 21, and 22.

As suggested in FIG. 1, energy-dissipation system 16 comprises a left-side ride-down pad 21, a right-side ride-down pad 22, and a separate interior pad 23. In the illustrated embodiment, energy-dissipation system 16 is coupled to seat back 14 of juvenile vehicle seat 10, and, in particular, to a headrest 26 included in seat back 14. In illustrative embodiments, energy-dissipation system 16 is mounted on an outside portion of juvenile vehicle seat 10 as suggested, for example, in FIGS. 1 and 11. It is within the scope of the present disclosure to couple one or more of the ride-down pads included in energy-dissipation system 16 on other portions of juvenile vehicle seat 10 or other juvenile seat or device to facilitate absorption of energy caused by external impact forces applied to such seats or devices.

In the illustrated embodiment, seat back 12 of juvenile vehicle seat 10 includes a backrest 24 arranged to extend upwardly from seat bottom 12 and a headrest 26 coupled to backrest 24. Left-side ride-down pad 21 is coupled to an outer wall of a first side-wing panel 31 included in headrest 26. Right-side ride-down pad 22 is coupled to an outer wall of a second side-wing panel 32 included in headrest 26. A somewhat C-shaped interior pad 23 is coupled to inner walls of first side-wing panel 31 and second side-wing panel 32. Interior pad 23 is also coupled to an inner wall of a rear panel 30 located between and arranged to interconnect first and second side-wing panels 31, 32 as suggested in FIG. 1. In the illustrated embodiment, interior pad 23 is arranged to surround partly the head of a child 100 seated in juvenile vehicle seat 10 to provide deformable padding for the child's head.

It is within the scope of the present disclosure to mount a ride-down pad similar to pads 21, 22 (or other pads disclosed herein) elsewhere on juvenile vehicle seat 10 (e.g., outside torso area, inside head area, outside back area) or on another device in a zone on such seat or device exposed to external impact forces. Ride-down pads 321, 322 in accordance with the present disclosure are mounted on inner walls of each of the first and second side-wing panels 331, 332 of headrest 326 in an illustrative child restraint 311 having an energy-dissipation system 816 as shown in FIG. 21. Ride-down pads 421, 422 are mounted on outer walls of the first and second side-wing panels 431, 432 of headrest 426 in an illustrative child restraint 411 shown in FIG. 22 while ride-down pads 441, 442 are also mounted on inner walls of those first and second side-wing panels 431, 432 to provide an energy-dissipation system 916.

During a collision or other incident, application of an external impact force 20 to left-side ride-down pad 21 causes energy to be transferred from an impacting object (not shown) to left-side ride-down pad 21 as suggested in FIG. 2. Ride-down pad 21 absorbs that transferred energy as suggested diagrammatically in FIG. 7-9 to minimize the magnitude of a resulting force 200 applied to a child 100 seated in juvenile vehicle seat 10 during the collision. Ride-down pad 21 functions to minimize the g-loads (acceleration) experienced by child 100 seated on seat bottom 12 of juvenile vehicle seat 10 during exposure of seat 10 to external impact force 20 as suggested in FIGS. 7-9. Ride-down pad 21 also functions to maximize the time interval (i.e., ride-down time) between the moment the impacting object strikes ride-down pad 21 to apply the external impact force and the moment that resulting force 200 reaches zero.

In an illustrative embodiment, as suggested in FIGS. 6-9, interior pad 23 cooperates with left-side ride-down pad 21 to minimize the magnitude of resulting force 200 applied to child 100 during, for example, a collision. A portion 23P of interior pad 23 is positioned to lie in a space provided between left-side ride-down pad 21 and child 100. A portion 31 P of first side-wing panel 31 is positioned to lie in a space provided between left-side ride-down pad 21 and portion 23P of interior pad 23.

As suggested in FIG. 3, left-side ride-down pad 21 is a multi-stage ride-down pad comprising a first (inner) force dissipater 41 and a second (outer) force dissipater 42. In an illustrative embodiment, each of first and second force dissipaters 41, 42 comprises a vessel (such as a bag) containing a deformable support frame (such as a cushion). First and second force dissipaters 41, 42 are stacked in series so that first force dissipater 42 lies in an inner position between second force dissipater 41 and first side-wing panel 31 of headrest 26 and so that second force dissipater 41 lies in an outer position in spaced-apart relation to first side-wing panel 31. It is within the scope of this disclosure to configure left-side ride-down pad 21 as a single-stage ride-down pad comprising only first force dissipater 41.

First (inner) force dissipater 41 includes a first bag 51 and a first cushion 61 as suggested in FIGS. 2 and 3. First bag 51 is formed to include a first air chamber 50 and a first air-discharge port 53 opening into first air chamber 50. First cushion 61 is sized to fit into first air chamber 50 to leave, in the illustrated embodiment, some empty space 54 in first air chamber 50 after first cushion 61 is located in first air chamber 50 as suggested, for example, in FIG. 6.

First bag 51 can be formed using any suitable method using any suitable material. In an illustrative embodiment, as suggested in FIG. 10, first bag 51 comprises a shell 511 formed to include first air-discharge port 53 and a closure 512 configured to be coupled to a rim 513 included in shell 511 to define first air chamber 50 between shell 511 and closure 512. Although first air-discharge port 53 is an aperture as suggested in FIG. 2 and first air-discharge port 212 is an aperture as suggested in FIG. 12, it is within the scope of this disclosure to provide a first air-discharge port defined by a slit or, as shown, in FIGS. 18-20, a cross-shaped pair of intersecting slits 501, 502.

Second (outer) force dissipater 42 includes a second bag 72 and a second cushion 62 as suggested in FIGS. 2 and 3. Second bag 72 is formed to include a second air chamber 70 and a second air-discharge port 73 opening into second air chamber 70. Second cushion 62 is sized to fit into second air chamber 70 to leave, in the illustrated embodiment, some empty space 55 in second air chamber 70 after second cushion 62 is located in second air chamber 70 as suggested, for example, in FIG. 6.

Second bag 72 can be formed using any suitable method using any suitable material. In an illustrative embodiment, as suggested in FIG. 10, second bag 72 comprises a shell 721 formed to include second air-discharge port 73 and a closure 722 configured to be coupled to a rim 723 included in shell 721 to define second air chamber 70 between shell 721 and closure 722. Although second air-discharge port is an aperture as suggested in FIG. 2 and second air-discharge port 224 is an aperture as suggested in FIG. 12, it is within the scope of this disclosure to provide a second air-discharge port defined by a slit or, as shown in FIGS. 18-20, a cross-shaped pair of intersecting slits 501, 502.

Cushions 61, 62 are illustrative examples of deformable support frames that are located in air chambers formed in bags 51, 72 or other vessels in accordance with the present disclosure. A deformable support frame as disclosed herein provides means for supporting the vessel (e.g., bag) to maintain at least a predetermined volume of air (or other fluid) in the air chamber until the vessel is deformed when exposed to an external impact force. The vessel is thus supported by the deformable support frame so that the vessel does not deform too quickly and deforms at a rate that allows the vessel to absorb external energy associated with the external impact force. In illustrative embodiments, the deformable support frame is a cushion that is sized to fill most of the air chamber in a companion vessel. Each of bags 51, 72 includes an air chamber (50 or 70) configured to store a predetermined volume of air and an air-discharge port configured to provide means for discharging a metered volume of air from that air chamber in response to application of an external impact force 20 is absorbed to minimize g-loads experienced by a child seated on the seat bottom of a juvenile vehicle seat.

Figure 7:
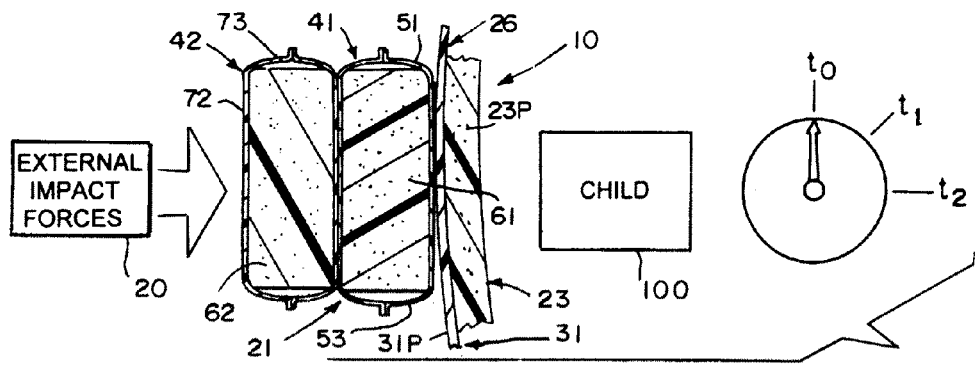
FIGS. 7-9 show a sequence in which the left-side ride-down pad is deformed in stages following sudden application of an external impact force to the second (outer) force dissipater to minimize the magnitude of a resulting force applied to a child seated in a juvenile vehicle seat including the left-side ride-down pad and thereby to minimize the g-load (acceleration) caused by the resulting force and experienced by the seated child.
Figure 8:
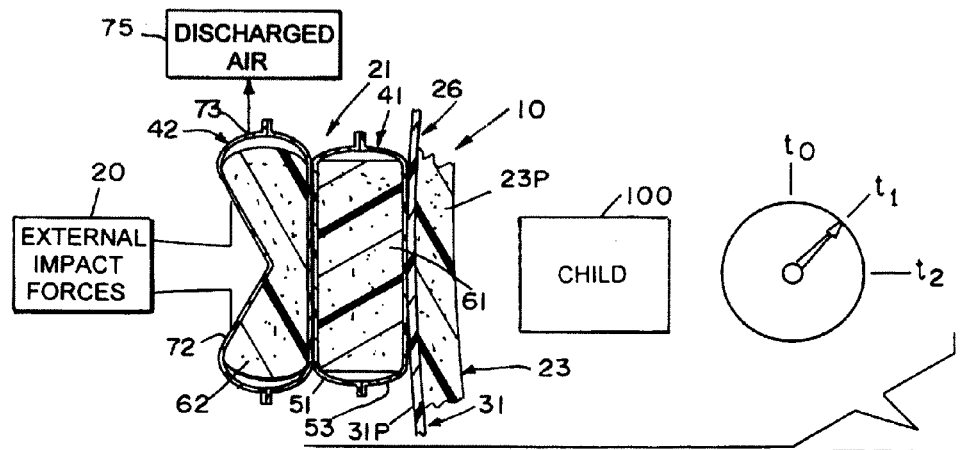
Figure 9:
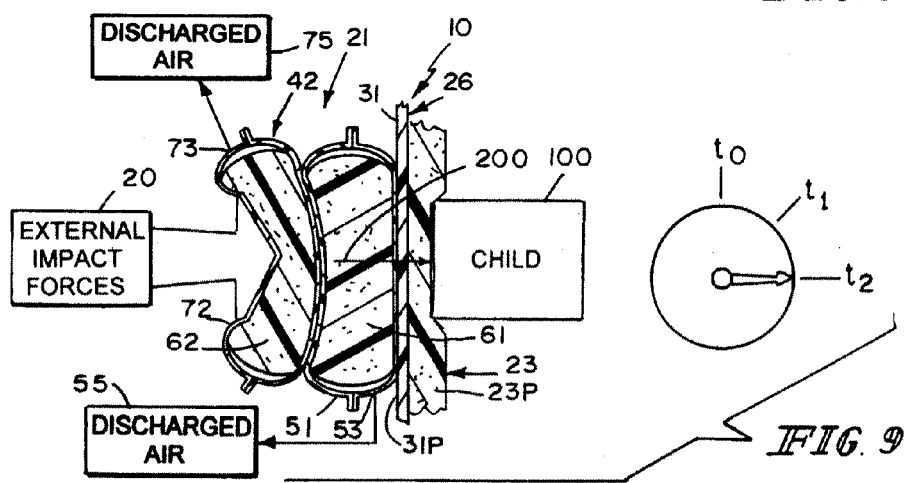
Figure 10:
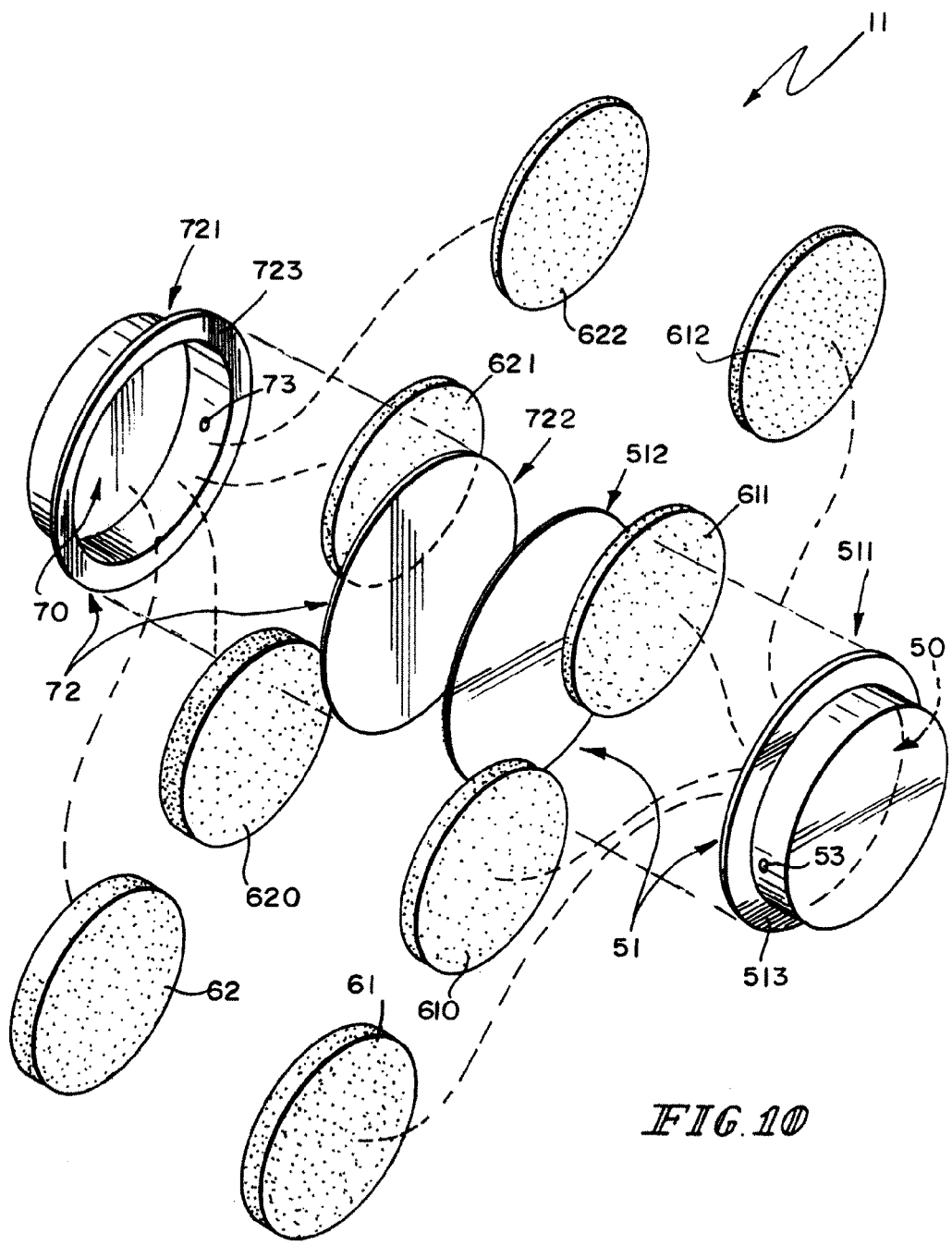
FIG. 10 is an exploded perspective view showing a ride-down pad kit in accordance with the present disclosure wherein the kit comprises four cushions associated with the first bag and four cushions associated with the second bag, each cushion provides a support frame in the air chamber of a companion bag and has a different deformation characteristic when exposed to an external impact force, and the deformability of each force dissipater can be varied by selecting a desired cushion from among the four available cushions and placing the selected cushion in a companion bag; to produce a force dissipater in accordance with the present disclosure.

Absorption of external impact force 20 by left-side ride-down pad 21 in combination with interior pad 23 is shown illustratively and diagrammatically in a sequence shown in FIGS. 7-9. Right-side ride-down pad 22 cooperates with interior pad 23 to absorb an external impact force in a similar manner when an external impact force strikes right-side ride-down pad 22. In the illustrated embodiment, interior pad 23 plays a cooperative role in absorbing external impact force 20; however, each ride-down pad 21, 22 could be used alone to absorb external impact force 20. It is within the scope of the present disclosure to mount one of ride-down pads 21, 22 in an impact strike zone on a juvenile seat or other device. It is within the scope of the present disclosure to mount a ride-down pad on an exterior or interior wall (or both an interior and exterior wall) of the seat or device.

As suggested diagrammatically in FIG. 7, each of force dissipaters 41, 42 included in left-side ride-down pad 21 is substantially undeformed at time $t_0$ before any collision involving juvenile vehicle seat 10 takes place. Interior pad 23 is also substantially undeformed at time $t_0$.

As suggested diagrammatically in FIG. 8, during a collision, external impact force 20 strikes second bag 72 in second (outer) dissipater 42 to deform at least second bag 72 and second cushion 62 in second air chamber 70 formed in second air bag 72. During such deformation, at later time $t_1$, some of the air extant in second air chamber 70 is discharged through second air-discharge port 73 as discharged air 75 to the atmosphere surrounding second bag 72. At time $t_1$, some of the transferred energy associated with external impact force 20 has been dissipated owing, in part, to deformation of second bag 72 and second cushion 62 and discharge of air from second air chamber 70 through second air-discharge port 73.

As suggested diagrammatically in FIG. 9, external impact force 20 acts to deform first bag 51 and first cushion 61 included in first (inner) force dissipater 41. Some of the air extant in first air chamber 50 is exhausted through first air-discharge port 53 as discharged air 55 as suggested in FIG. 9. At later time $t_2$, juvenile vehicle seat 10 has moved relative to child 100 to cause a portion (e.g., the head) of child 100 to contact and deform portion 23P of interior pad 23. First (inner) and second (outer) force dissipaters 41, 42 and interior pad 23 cooperate to absorb energy transferred by external impact force 20 to minimize resulting force 200 applied to child 100 seated in juvenile vehicle seat 10. This energy absorption feature minimizes the g-loads (acceleration) experienced by child 100 and also maximizes the ride-down time between the first strike of an impacting object on second (outer) force dissipater 42 of left-side ride-down pad 21 and the moment that resulting force 200 reaches zero.

In the illustrated embodiment, first (inner) and second (outer) force dissipaters 41, 42 are oriented relative to one another to cause first air-discharge port 53 of first force dissipater 41 to face (e.g., forwardly) in a first direction 101 and second air-discharge port 73 of second force dissipater 42 to face (e.g., rearwardly) in an opposite second direction 102 as suggested in FIGS. 2 and 3. In an illustrative embodiment, air-discharge ports 53, 73 are separated from one another by an effective included angle of about 180° as suggested in FIGS. 2, 3, and 6.

Figure 17:
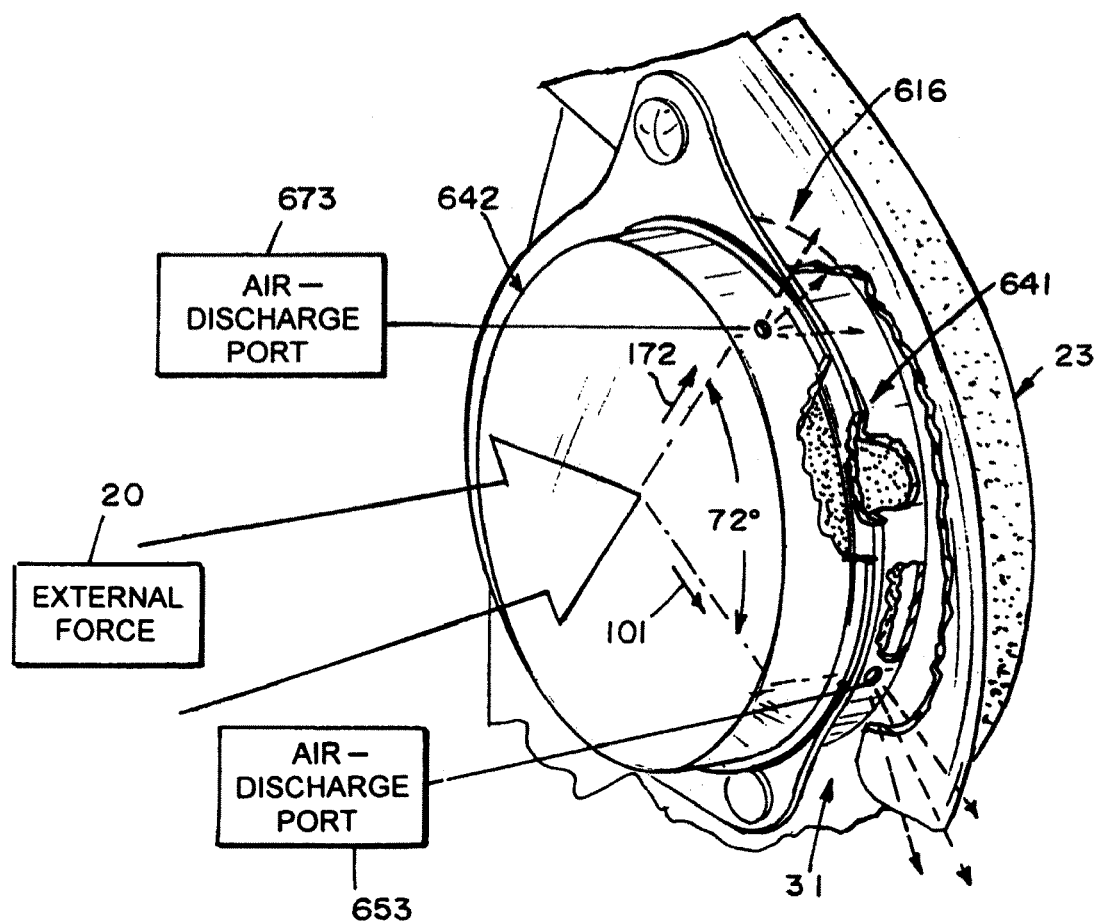
FIG. 17 is a perspective view similar to FIG. 12 showing an alternative location of the second air-discharge port of the second (outer) force dissipater relative to the first air-discharge port of the first (inner) force dissipater wherein the angular separation between the first and second air-discharge port is characterized by an included angle therebetween of about 72°.

In an alternative illustrated embodiment shown in FIG. 17, first (inner) and second (outer) force dissipaters 641, 642 included in energy-dissipation system 616 are oriented relative to one another to cause first air-discharge port 653 of first force dissipater 641 to face (e.g., forwardly) in first direction 101 and second air-discharge port 673 of second force dissipater 642 to face (e.g., forwardly and upwardly) in a second direction 172. In an illustrated embodiment, air-discharge ports 653, 673 are separated from one another by an effective included angle of about 72° as suggested in FIG. 17.

Any suitable means may be used to retain first and second force dissipaters 41, 42 in the mounted positions shown in FIGS. 2, 4, and 6. In an illustrative embodiment, (e.g., hook-and-loop) fasteners 44 and 46 are used as suggested in FIGS. 5 and 6. Fastener 44 retains second (outer) force dissipater 42 in a fixed position relative to first (inner) force dissipater 41 when coupled to both of first and second force dissipaters 41, 42 as suggested in FIG. 6. Fastener 46 retains first (inner) force dissipater 41 in a fixed position relative to first side-wing panel 31 of headrest 26 when coupled to both of first force dissipater 41 and first side-wing panel 31 as suggested in FIG. 6.

In illustrative embodiments, each of air bags 51, 72 is made of a plastics material such as polyvinyl chloride (PVC) or nylon. In one illustrative embodiment, each of bags 51, 72 is made of a sheet of PVC or nylon and has a nominal thickness of about 0.030 inch (0.076 centimeters). In an illustrative embodiment, the volume of each bag 51, 72 is about 28.27 cubic inches (463.33 cubic centimeters) and the diameter of each round air-discharge port 53, 73 is about three-sixteenths inch (0.476 cm). It is within the scope of this disclosure to vary the shape, size, and number of air-discharge ports to provide means for metering flow of air discharged from each of air chambers 50, 70 at a rate to cause bags 51, 72 to deflate in about one to ten milliseconds depending on the number of air-discharge ports and the material used to form cushions 61, 62. For example, a single round air-discharge port 53 could be replaced by two or more smaller side-by-side or adjacent air-discharge ports (not shown) having a combined area about equivalent to the area of the single round air-discharge port 53. It is within the scope of this disclosure to use a variety of hole shapes and sizes such as a cruciform shape shown in FIGS. 18-20. In illustrative embodiments, the number of air-discharge ports 53, 73 varies from two to four per bag depending upon the material used to form cushions 61, 62.

Each of first and second cushions 61, 62 and interior pad 23 is configured to deform at about a predetermined rate when exposed to a predetermined external impact force 20. Each bag 51, 72 contains a volume of air that is discharged at a metered rate when the bag 51 or 72 is exposed to an external impact force 20. By calibrating deformation characteristics of each of cushions 61, 62 and each of bags 51, 72 in accordance with the present disclosure, one can establish for each force dissipater 41, 42 and ride-down pad 21, 22 a selected energy absorption characteristic and ride-down time associated with an external impact force of a specified magnitude. In other words, in accordance with the present disclosure, energy-dissipation system 16 comprising ride-down pad 21 and interior pad 23 is programmable to yield an applied g-load to child 100 in seat 10 over a specified ride-down time in response to exposure of ride-down pad 21 to a specified external impact force 20. It is within the scope of this disclosure to make cushions 61, 62 out of fluid foam, microspheres, gels, liquids, crushable designed material, foams (e.g., Extruded Polymer Products (EPP), Extra Cellular Polymer Substances (EPS), Polyurethane (PU), Thermoplastic Elastomer (TPE), Polypropylene (PP), etc.), polystyrene (PS), viscoelastic polymener, fluidized air, air, or combinations of the foregoing materials.

As suggested in FIGS. 1, 3, and 4, an outer cover 48 is coupled to headrest 26 and arranged to cover each of left-side and right-side ride-down pads 21, 22. Outer cover 48 also functions to dissipate energy associated with external impact forces 20 and to protect first and second force dissipaters 41, 42 from damage.

A ride-down pad kit 11 in accordance with the present disclosure is shown, for example, in FIG. 10. In kit 11, any of an assortment of deformable support frames (e.g., cushions 61, 610, 611, 612) could be placed in first air chamber 50 associated with first force dissipater 41 to change the energy-dissipation (i.e., deformation) rate of first force dissipater 41. Likewise, any of cushions 62, 620, 621, 622 could be placed in second air chamber 70 associated with second force dissipater 42 to change the energy-dissipation (i.e., deformation) rate of second force dissipater 42. Each cushion is configured to exhibit a characteristic deformation rate in response to a specified external impact force. It is within the scope of this disclosure to vary the number and kind of cushions placed in an air chamber.

Figure 11:
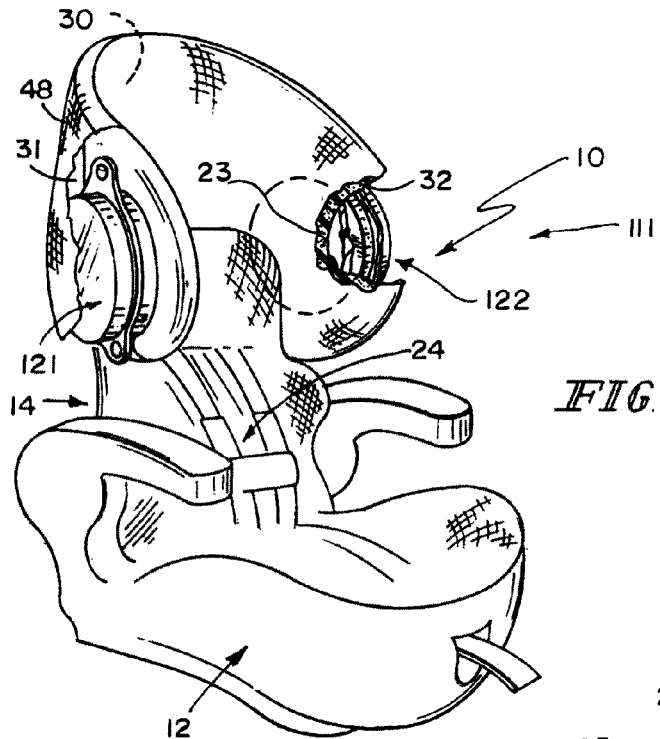
FIG. 11 is a perspective view of a child-restraint system including a juvenile vehicle seat and an energy-dissipation system in accordance with a second embodiment of the present disclosure.

As suggested in FIG. 11, an energy-dissipation system 116 in accordance with a second embodiment of the present disclosure comprises a left-side ride-down pad 121, a right-side ride-down pad 122, and a separate interior pad 23. In the illustrated embodiment, energy-dissipation system 116 is coupled to seat back 14, and, in particular, to a headrest 26 included in seat back 14 of juvenile vehicle seat 110.

Figure 12:
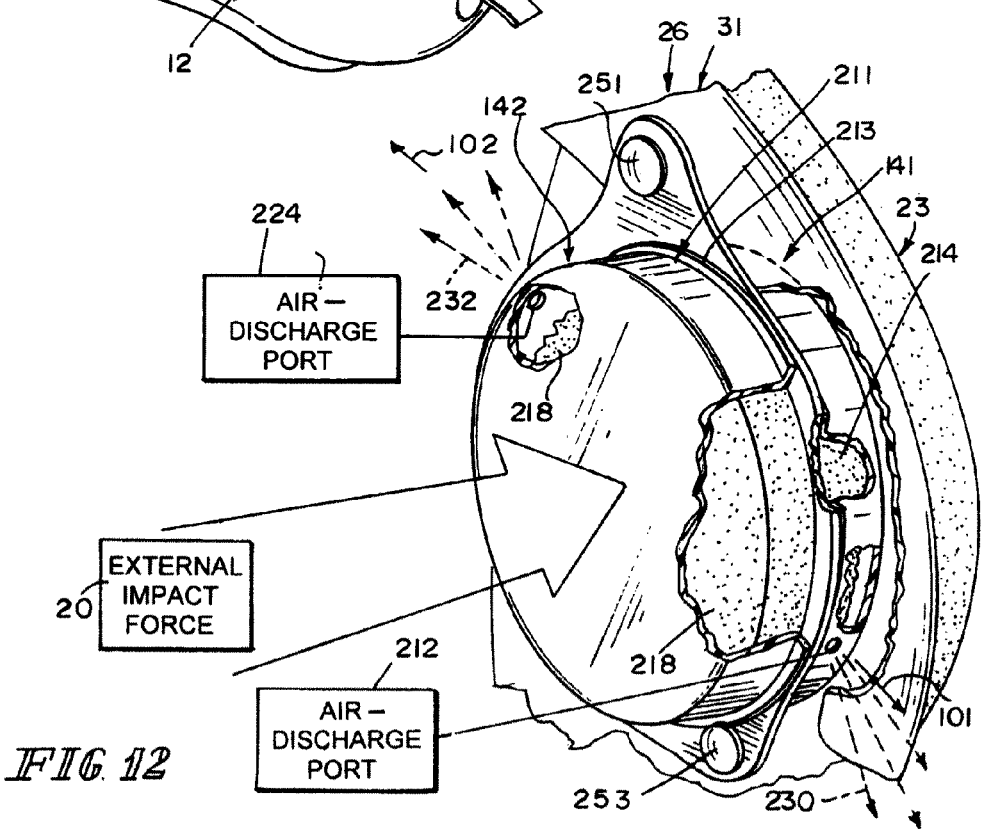
FIG. 12 is an enlarged perspective view of the left-side ride-down pad and the first side wing of the headrest shown in FIG. 11, with portions broken away.

During a collision or other incident, application of an external impact force 20 to left-side ride-down pad 121 causes energy to be transferred from an impacting object (not shown) to left-side ride-down pad 121 as suggested in FIG. 12. Ride-down pad 121 absorbs or otherwise dissipates that transferred energy as suggested diagrammatically in FIGS. 14-16 to minimize the magnitude of a resulting force 200 applied to a child 100 seated in juvenile vehicle seat 10 during the collision. Ride-down pad 121 functions to minimize the g-loads (acceleration) experienced by a child seated on seat bottom 12 of juvenile vehicle seat 110 during exposure of child restraint to external impact force 20. Ride-down pad 121 also functions to maximize the time interval (i.e., ride-down time) between the moment the impacting object strikes ride-down pad 121 to apply the external impact force and the moment that resulting force 200 reaches zero.

Figure 13:
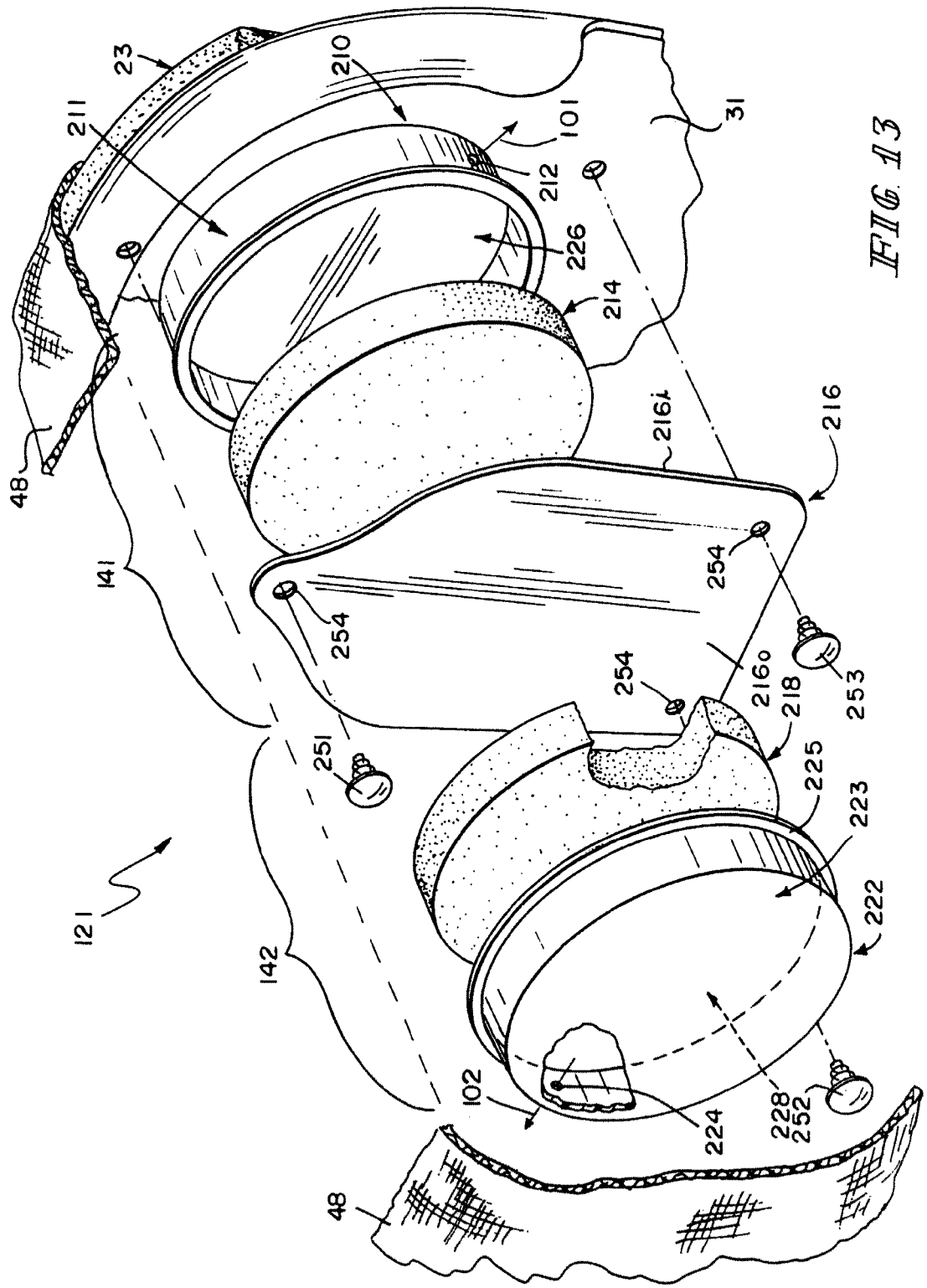
FIG. 13 is an exploded perspective assembly view of the left-side ride-down pad of FIG. 12 showing that the ride-down pad comprises, in sequence, from right to left, an inner shell formed to include a forwardly facing first air-discharge port, a first cushion, a partition, a second cushion, and an outer shell formed to include a rearwardly facing second air-discharge port and suggesting that the inner shell and the partition cooperate to form a first air chamber sized to receive the first cushion therein and that the outer shell and the partition cooperate to form a second air chamber sized to receive the second cushion therein.

As suggested in FIG. 13, left-side ride-down pad 121 comprises, in sequence, from right to left, an inner shell 210 formed to include a first air-discharge port 212, a first cushion 214, a partition 216, a second cushion 218, and an outer shell 222 formed to include a second air-discharge port 224. Right-side ride-down pad 122 has a similar construction.

An inner surface 216i of partition 216 mates with inner shell 210 to form a first air chamber 226 therebetween as suggested in FIGS. 12 and 13. First cushion 214 is located in first air chamber 226 to cooperate with inner shell 210 and inner surface 216i of partition 216 to establish a first (inner) force dissipater 141 included in left-side ride-down pad 122. In an illustrative embodiment, inner shell 210 includes a dome 211 and a rim 213 appended to a perimeter edge of dome 211 as suggested in FIG. 13. Rim 213 mates with inner surface 216i of partition 216 to form a first (inner) bag.

An outer surface 216o of partition 216 mates with outer shell 222 to form a second air chamber 228 therebetween as suggested in FIGS. 12 and 13. Second cushion 218 is located in second air chamber 228 to cooperate with outer shell 222 and outer surface 216o of partition 216 to establish a second (outer) force dissipater 142 included in left-side ride-down pad 121. In an illustrative embodiment, outer shell 222 includes a dome 223 and a rim 225 appended to a perimeter edge of dome 223 as suggested in FIGS. 12 and 13. Rim 225 mates with outer surface 216o of partition 216 to form a second (outer) bag.

Figure 14:
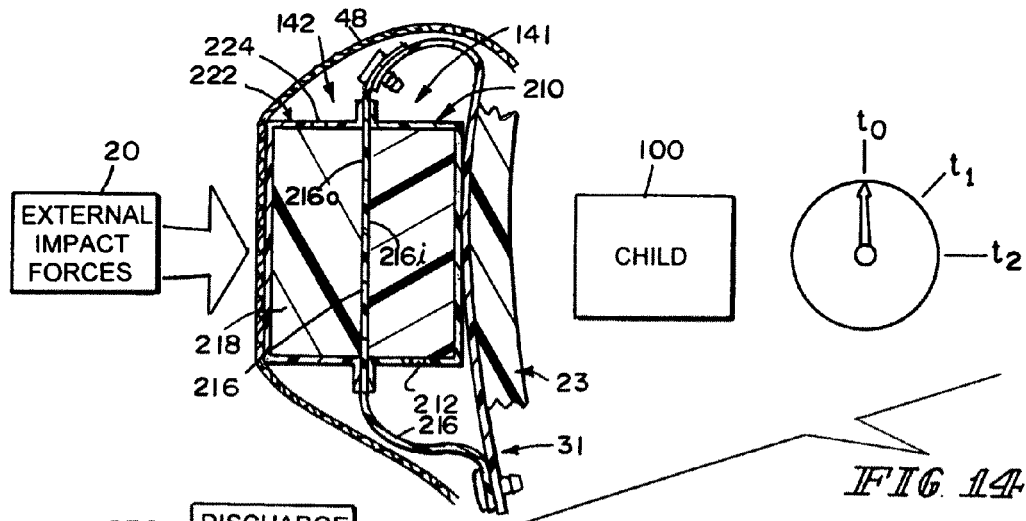
FIGS. 14-16 show a sequence in which the left-side ride-down pad is deformed following application of an external impact force to the second (outer) force dissipater to minimize the magnitude of a resulting force applied to a child seated in a juvenile vehicle seat carrying the left-side ride-down pad and thereby to minimize the g-load (acceleration) caused by the resulting force and experienced by the seated child.
Figure 15:
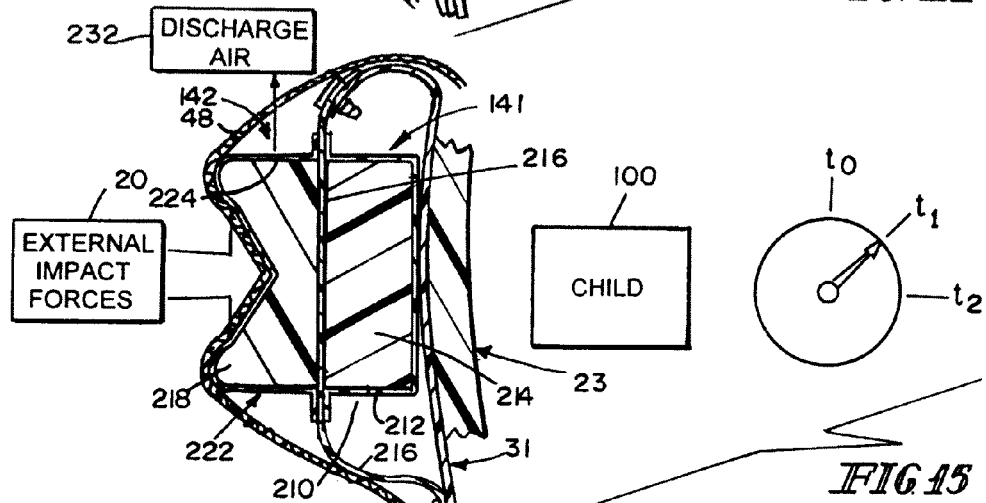
Figure 16:
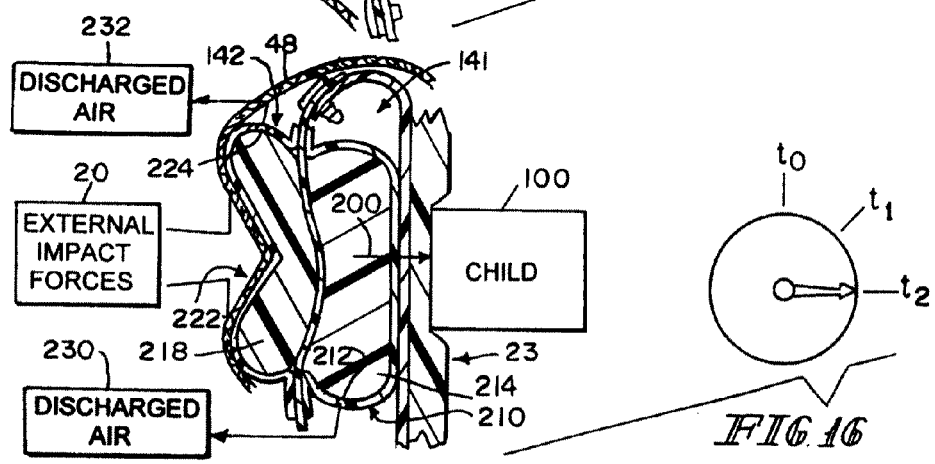

Absorption of external impact force 20 by left-side ride-down pad 121 in combination with interior pad 23 is shown illustratively and diagrammatically in a sequence shown in FIGS. 14-16. Right-side ride-down pad 122 cooperates with interior pad 23 to absorb an external impact force in a similar manner. In the illustrated embodiment, interior pad 23 plays a cooperative role in absorbing external impact force 20; however, each ride-down pad 121, 122 could be used alone to absorb external impact force 20. It is within the scope of the present disclosure to mount on one of ride-down pads 121, 122 in an impact strike zone on a juvenile seat or other device. It is within the scope of the present disclosure to mount a ride-down pad on an exterior or interior wall (or both an interior and exterior wall) of the seat or device.

As suggested diagrammatically in FIG. 14, each of force dissipaters 141, 142 included in left-side ride-down pad 121 is substantially undeformed at time $t_0$ before any collision involving juvenile vehicle seat 110 takes place. Interior pad 23 is also substantially undeformed at time $t_0$.

As suggested diagrammatically in FIG. 15, during a collision, external impact force 20 strikes outer shell 222 in second (outer) dissipater 142 to deform at least outer shell 222 and second cushion 218 in second air chamber 228. During such deformation, at later time $t_1$, some of the air extant in second air chamber 228 is discharged through second air-discharge port 224 at a metered rate as discharged air 232 to the atmosphere surrounding outer shell 222. At later time $t_1$, some of the transferred energy associated with external impact force 20 has been dissipated owing to deformation of second force dissipater 142 and discharge of air from second air chamber 228 through second air-discharge port 224.

As suggested diagrammatically in FIG. 16, external impact force 20 acts to deform partition 216 and inner shell 210 and first cushion 214. Air extant in first air chamber 226 is exhausted through first air-discharge port 212 at a metered rate as discharged air 230 as suggested in FIG. 16. At later time $t_2$, juvenile vehicle seat 110 has moved relative to child 100 to cause a portion (e.g., the head) of child 100 to contact and deform a portion of interior pad 23. First (inner) and second (outer) force dissipaters 141, 142 and interior pad 23 cooperate to absorb energy transferred by external impact force 20 to minimize resulting force 200 applied to child 100 seated in juvenile vehicle seat 110. This energy absorption feature minimizes the g-loads (acceleration) experienced by child 100 and also maximizes the ride-down time between the first strike of an impacting object on second (outer) force dissipater 142 of left-side ride-down pad 121 and the moment that resulting force 200 reaches zero.

In the illustrated embodiment, first (inner) and second (outer) force dissipaters 141, 142 are oriented relative to one another to cause first air-discharge port 212 of first force dissipater 141 to face (e.g., forwardly) in a first direction 101 and second air-discharge port 224 of second force dissipater 142 to face (e.g., rearwardly) in an opposite second direction 102 as suggested in FIGS. 12 and 13. In an illustrative embodiment, air-discharge ports 212, 224 are separated from one another by an effective angle of about 180° as suggested in FIGS. 12 and 13.

Any suitable means may be used to retain first and second force dissipaters 141, 142 in the mounted positions shown in FIGS. 11-16. In an illustrative embodiment, fasteners 251, 252, and 253 are used as suggested in FIG. 13 to retain first and second force dissipaters 141, 142 in a fixed position on first side-wing 31 of headrest 26. Each fastener 251-233 passes through one of the three fastener-receiving apertures 254 formed in an outer portion of partition 216 and mates with first side-wing panel 31 of headrest 26 as suggested in FIGS. 12 and 13.

As suggested in FIGS. 11 and 13-16, an outer cover 48 is coupled to headrest 26 and arranged to cover each of left-side and right-side ride-down pads 121, 122. Outer cover 48 also functions to dissipate energy associated with external impact forces 20 and to protect first and second force dissipaters 141, 142 from damage.

As suggested in FIGS. 18-20, a first (inner) force dissipater 741 includes a first air-discharge port 753 and a second (outer) force dissipater 742 includes a second air-discharge port 773. Each of air-discharge ports 753, 773 comprises a slit 501 or 502. In the illustrated embodiment, each of air-discharge ports 753, 773 is a cruciform opening defined by a cross-shaped pair of orthogonal intersecting slits 501, 502. As suggested in FIGS. 18 and 19, four adjacent corner-shaped flaps 401, 402, 403, 404 cooperate to define slits 501, 502 of air-discharge port 753 and four other adjacent corner-shaped flaps 411, 412, 413, 414 cooperate to define slits 501, 502 of air-discharge port 773. Four adjacent corner-shaped flaps 411, 412, 413, 414 separated from one another by the cross-shaped pair of intersecting slits 501, 502 are spread apart as shown in FIG. 19 to discharge air extant in a companion air chamber in response to application of an external force 20 to the bag of the second (outer) force dissipater 742.

The invention claimed is:

1. A child restraint comprising
a juvenile vehicle seat and
an energy-dissipation system coupled to the juvenile vehicle seat, the energy-dissipation system comprising a first force dissipater including a first bag formed to include a first air chamber and a first air-discharge port opening into the first air chamber and a first support frame located in the first air chamber and made of a deformable material and configured to support the first bag to maintain at least a predetermined volume of air in the first air chamber until the first bag and the first support frame are deformed when exposed to an external impact force, wherein the first air-discharge port is configured to provide means for discharging air from the first air chamber to the surroundings at a metered rate when the first bag is exposed to the external impact force so that the first force dissipater absorbs external energy associated with the external impact force to minimize g-loads experienced by a child seated in the juvenile vehicle seat.

2. The child restraint of claim 1, wherein the energy-dissipation system further comprises a second force dissipater formed to include a second air chamber and arranged to lie in spaced-apart relation to the juvenile vehicle seat to locate the first force dissipater between the second force dissipater and the juvenile vehicle seat and the second force dissipater cooperates with the first force dissipater to define means for absorbing external energy applied to the second force dissipater and transferred to the juvenile vehicle seat via the first force dissipater to minimize g-loads experienced by a child seated in the juvenile vehicle seat.

3. The child restraint of claim 2, wherein the second force dissipater includes a second bag formed to include the second air chamber and a second air-discharge port opening into the second air chamber and a second support frame located in the second air chamber and made of a deformable material and configured to support the second bag to maintain at least a predetermined volume of air in the second air chamber until the second bag and the second support frame are deformed when exposed to an external impact force, wherein the second air-discharge port is configured to provide means for discharging air from the second air chamber to the surroundings at a metered rate when the second bag is exposed to the external impact force so that the second force dissipater absorbs external energy associated with the external impact force to minimize g-loads experienced by a child seated in the juvenile vehicle seat.

4. The child restraint of claim 3, wherein the first and second bags are oriented relative to one another to cause the first air-discharge port of the first bag to face in a first direction and to cause the second air-discharge port of the second bag to face in a second direction to cause the first and second air-discharge ports to be separated from one another by an effective included angle of about 72°.

5. The child restraint of claim 2, wherein the juvenile vehicle seat includes a seat bottom and a seat back extending upwardly from the seat bottom, the first force dissipater is coupled to the seat back, and the second force dissipater is arranged to lie in spaced-apart relation to the seat back to locate the first force dissipater therebetween.

6. The child restraint of claim 5, wherein the seat back includes a headrest and a backrest arranged to interconnect the headrest and the backrest and the first force dissipater is coupled to the headrest.

7. The child restraint of claim 1, wherein the first support frame is a cushion is sized to fit into the first air chamber to leave some empty space in the first air chamber after the first cushion is located in the first air chamber and maintained in an undeformed state therein.

8. The child restraint of claim 7, wherein the energy-dissipation system further comprises a second force dissipater including a second bag and a second support frame and the second bag is arranged to lie in spaced-apart relation to the juvenile vehicle seat to locate the first bag therebetween.

9. A child restraint comprising
a juvenile vehicle seat including a seat bottom and a seat back extending upwardly from the seat bottom, the seat back including a headrest and a backrest extending between the seat bottom and the headrest, the headrest including a first side-wing panel and a second side-wing panel arranged to lie in spaced-apart relation to the first side-wing panel to define a child-receiving space therebetween, and
an energy-dissipation system coupled to the headrest, the energy-dissipation system comprising a first ride-down pad coupled to the first side-wing panel and a second ride-down pad coupled to the second side-wing panel, wherein each of the first and second ride-down pads includes a first deformable bag formed to include a first air chamber storing a predetermined volume of air and a first air-discharge port configured to provide means for discharging a metered volume of air from the first air chamber in response to application of an external impact force to the first deformable bag so that external energy associated with the external impact force is absorbed to minimize g-loads experienced by a child seated on the seat bottom of the juvenile vehicle seat.

10. The child restraint of claim 9, wherein the first side-panel wing includes an inner wall facing toward the second side-panel wing and an outer wall facing away from the second side-panel wing, the second side-panel wing includes an inner wall facing toward the first side-panel wing and an outer wall facing away from the first side panel wing, the first ride-down pad is coupled to the outer wall of the first side-wing panel, and the second ride-down pad is coupled to the outer wall of the second side-wing panel.

11. The child restraint of claim 10, wherein each of the first and second ride-down pads further includes a second deformable air bag formed to include a second air chamber storing a predetermined volume of air and a second air-discharge port configured to provide means for discharging a metered volume of air from the second air chamber in response to application of an external impact force to the second deformable bag so that external energy associated with the external impact force is absorbed to minimize g-loads experienced by a child seated on the seat bottom of the juvenile vehicle seat.

12. The child restraint of claim 11, wherein the second deformable air bag of the first ride-down pad is arranged to lie in spaced-apart relation to the outer wall of the first side-wing panel to locate the first deformable air bag of the first ride-down pad therebetween and the second deformable air bag of the second ride-down pad is arranged to lie in spaced-apart relation to the outer wall of the second side-wing panel to locate the first deformable air bag of the second ride-down pad therebetween.

13. The child restraint of claim 12, wherein the first and second deformable air bags of each of the first and second ride-down pads are oriented relative to one another to cause the first and second air-discharge ports thereof to be separated by an effective included angle of about 72°.

14. The child restraint of claim 12, wherein the first and second deformable air bags of each of the first and second ride-down pads are oriented relative to one another to cause the first and second air-discharge ports thereof to face in opposite directions.

15. The child restraint of claim 9, wherein the first side-panel wing includes an inner wall facing toward the second side-panel wing and an outer wall facing away from the second side-panel wing, the second side-panel wing includes an inner wall facing toward the first side-panel wing and an outer wall facing away from the first side panel wing, the first ride-down pad is coupled to the inner wall of the first side-wing panel, and the second ride-down pad is coupled to the inner wall of the second side-wing panel.

16. The child restraint of claim 15, wherein each of the first and second ride-down pads further includes a second deformable air bag formed to include a second air chamber storing a predetermined volume of air and a second air-discharge port configured to provide means for discharging a metered volume of air from the second air chamber in response to application of an external impact force to the second deformable bag so that external energy associated with the external impact force is absorbed to minimize g-loads experienced by a child seated on the seat bottom of the juvenile vehicle seat.

17. The child restraint of claim 16, wherein the second deformable air bag of the first ride-down pad is arranged to lie in spaced-apart relation to the inner wall of the first side-wing panel to locate the first deformable air bag of the first ride-down pad therebetween and the second deformable air bag of the second ride-down pad is arranged to lie in spaced-apart relation to the inner wall of the second side-wing panel to locate the first deformable air bag of the second ride-down pad therebetween.

18. The child restraint of claim 17, wherein the first and second deformable air bags of each of the first and second ride-down pads are oriented relative to one another to cause the first and second air-discharge ports thereof to be separated by an effective included angle of about 72°.

19. The child restraint of claim 17, wherein the first and second deformable air bags of each of the first and second ride-down pads are oriented relative to one another to cause the first and second air-discharge ports thereof to face in opposite directions.

20. The child restraint of claim 9, wherein each of the first and second ride-down pads further includes a deformable first support frame located in the first air chamber and configured to provide means for supporting the first air bag to maintain at least the predetermined volume of air in the first air chamber until the first air bag is deformed when exposed to the external impact force so that the first air bag deforms at a rate that allows the air bag to absorb external energy associated with the external impact force.

21. The child restraint of claim 20, wherein each deformable first support frame is an elastic cushion sized substantially to fill the first air chamber.

22. A child restraint comprising
a juvenile vehicle seat and
an energy-dissipation system coupled to the juvenile vehicle seat, the energy-dissipation system including a first ride-down pad coupled to the juvenile vehicle seat and configured to provide means for absorbing external energy associated with an external impact force applied to the first ride-down pad so that g-loads experienced by a child seated on the juvenile vehicle seat are minimized, wherein the first ride-down pad includes a deformable first air bag formed to include a first air chamber containing a predetermined volume of air and coupled to the juvenile vehicle seat and a deformable second air bag formed to include a second air chamber containing a predetermined volume of air and arranged to lie in spaced-apart relation to the juvenile vehicle seat to locate the first air bag therebetween.

23. The child restraint of claim 22, wherein each of the first and second air bags is formed to include an air-discharge port configured to provide means for discharging a metered volume of air from a companion one of the first and second air chambers in response to application of the external impact force to the first ride-down pad.

24. The child restraint of claim 23, wherein the first and second deformable air bags of each of the first and second ride-down pads are oriented relative to one another to cause the first and second air-discharge ports thereof to be separated by an effective included angle of about 72°.

25. The child restraint of claim 23, wherein the first and second deformable air bags of each of the first and second ride-down pads are oriented relative to one another to cause the first and second air-discharge ports thereof to face in opposite directions.

26. The child restraint of claim 23, wherein the first ride-down pad further includes a deformable first support frame located in the first air chamber and a deformable second support frame located in the second air chamber.

27. The child restraint of claim 26, wherein the deformable first support frame is configured to provide means for supporting the first air bag to maintain at least the predetermined volume of air in the first air chamber until the first air bag is deformed in response to application of the external impact force to the first ride-down pad and the deformable second support frame is configured to provide means for supporting the second air bag to maintain at least the predetermined volume of air in the second air chamber until the second air bag is deformed in response to application of the external impact force to the first ride-down pad.

* * * * *